US00RE35629E

United States Patent [19]

Murakami et al.

[11] E Patent Number: Re. 35,629

[45] Reissued Date of Patent: Oct. 14, 1997

[54] MAGNETO-OPTICAL MEMORY ELEMENT

[75] Inventors: Yoshiteru Murakami, Nishinomiya; Akira Takahashi, Nara; Kazuo Van, Nara; Junichiro Nakayama, Nara-ken; Hiroyuki Katayama, Nara; Kenji Ohta, Nara-ken, all of Japan

[73] Assignee: Sharp Kabushiki Kaisha, Osaka, Japan

[21] Appl. No.: 136,019

[22] Filed: Oct. 14, 1993

Related U.S. Patent Documents

Reissue of:

[64] Patent No.: 5,058,099
Issued: Oct. 15, 1991
Appl. No.: 391,249
Filed: Aug. 9, 1989

[30] Foreign Application Priority Data

Aug. 12, 1988 [JP] Japan ..... 63-202359

[51] Int. Cl.[6] ..... G11B 7/24

[52] U.S. Cl. ..... 369/288; 369/283; 360/131; 428/694 RE; 428/694 MT; 428/694 MM; 356/369; 365/122

[58] Field of Search ..... 369/272, 275, 369/280–288, 275.1–275.5; 360/131, 134–5; 428/692, 694, 697, 900, 694 R, 694 ML, 694 SC, 694 DE, 694 MT, 694 RE, 694 RL

[56] References Cited

U.S. PATENT DOCUMENTS

| | | | |
|---|---|---|---|
| 4,003,663 | 1/1977 | Steinberg | 356/243 |
| 4,410,277 | 10/1983 | Yamamoto et al. | 356/366 |
| 4,639,816 | 1/1987 | Tomita | 360/131 |
| 4,740,447 | 4/1988 | Itoh et al. | 369/288 X |
| 4,833,043 | 5/1989 | Gardner | 369/288 X |
| 4,837,130 | 6/1989 | Ohta et al. | 369/288 X |

FOREIGN PATENT DOCUMENTS

| | | |
|---|---|---|
| 0297689 | 1/1989 | European Pat. Off. . |
| 0318337 | 5/1989 | European Pat. Off. . |

*Primary Examiner*—David S. Martin

[57] ABSTRACT

A magneto-optical memory element has a multi-layer construction in the order from a side first receiving light from a light-source which includes a first transparent dielectric film, a rare earth transition metal alloy film, a second transparent dielectric film and a reflective film. The magneto-optical device uses circular dichroism effect of a magnetic mater for reading information. The rare earth transition metal alloy film has a refractive index represented by $n \pm \Delta n$ wherein $n=3.2-3.55i$ and $\Delta n=0.05-0.03i$. The thickness of film is about 18 to 46 nm. The second transparent dielectric film has a refractive index of $2.0 \pm 0.2$ and a film thickness of 80 to 108 nm.

18 Claims, 5 Drawing Sheets

MAGNETO-OPTICAL MEMORY ELEMENT

Matter enclosed in heavy brackets [ ] appears in the original patent but forms no part of this reissue specification; matter printed in italics indicates the additions made by reissue.

FIELD OF THE PRESENT INVENTION

The present invention relates to a magneto-optical memory element with which writing, reading and erasing of information are performed by the irradiation of a laser beam.

BACKGROUND OF THE PRESENT INVENTION

Magneto-optical memory elements have been actively studied as memory elements capable of recording, reading and erasing information. Particularly, the elements which employ a rare earth transition metal alloy film as a memory medium are very suitable, because the memory bits are not affected by grain boundary and the memory medium film can be made large.

In a magneto-optical recording and reading apparatus, polarized light is applied onto the magneto-optical memory element and the light which is reflected therefrom is subjected to the rotation of reflected polarized plane by magneto-optical effects, such as Kerr effect and Faraday effect, and is detected to read information.

FIG. 6 schematically shows the magnetic-optical recording and reading apparatus and FIG. 7 is a drawing explaining its functional principle.

In FIG. 6, 20 shows a semiconductor laser which generates linear polarized light 21 shows a collimator lens 22 is a polarizer 23 is a half mirror, and 24 is an objective lens. A analyzer 25 converts the polarized direction of the reflected light to light intensity. The number 26 is a photodiode which detects the output of the light intensity from the analyzer 25.

The light generated from the semiconductor laser 20 is preliminary changed through the collimator lens 21 to parallel light and then changed through the polarizer 22 to a first linear polarized light having a polarized direction of a in FIG. 7. The first linear polarized light a is converged through the half mirror 23 and the objective lens 24 onto a recording medium 28 formed on a transparent substrate 27. The first linear light a is reflected therefrom to form reflected light b or b' according to the magneto-optical effects (e.g. Kerr effect). The reflected light has a polarized direction (Kerr rotation angle of $\theta_k$ or $\theta_k'$) which corresponds with the recorded information of "0" or "1" stored on the recording medium 28 in the form of a magnetizing direction. For example, b corresponds to bit information "0" (an up magnetizing direction) and b' corresponds to bit information "1" (a down magnetizing direction). The reflected light is passed through the objective lends 23 and reflected by the half mirror 23 toward the analyzer 25. If the analyzer 25 is placed in the direction c of FIG. 7, it detects the light intensity d and d' which correspond to the polarized direction of the reflected light b and b'. Then, the photodiode 26 receives the reflected light b or b', which has an intensity of d or d', through the analyzer 25, and the information is read out as an electric signal corresponding to the intensity d or d' by a signal processing circuit (not shown in Drawings) connected to the photodiode 26.

As is apparent from the above mentioned explanation, in order to enhance the quality of readout signals, the photomagnetic recording and reading apparatus in which reading of information is conducted by the Kerr effect of the magneto-optical memory element is required to have an increased Kerr rotational angle.

However, when the magneto-optical memory element comprises a rare earth transition metal alloy film as a memory medium, the Kerr rotation angle is small and insufficient to enhance the quality of readout signals.

In order to obviate the above mentioned problems, a Japanese Kokai Publication (unexamined) proposes a magneto-optical memory element which adopts a multi-layer construction. FIG. 8 shows a partial sectional view of the magneto-optical memory element of this construction.

In FIG. 8, 30 indicates a transparent substrate of glass, polycarbonate, epoxy resin and the like and 31 shows a first transparent dielectric film which as a higher refractive index than the transparent substrate 30. The number 32 is a rare earth transition metal alloy film 33 is a second transparent dielectric film, and 34 is a metal reflective film. In this construction, the rare earth transition metal alloy film is so than that the light which reaches the alloy film partially passes therethrough. This construction has a Faraday effect which takes place upon passing the light through the rare earth transition metal alloy film 32, reflection from the metal reflective film 34 and again passing through the alloy film 32, in addition to Kerr effect which takes place by reflecting the light from the alloy film 32. Accordingly, the Kerr rotation angle appears to be increased several times, in comparison with the magneto-optical memory element only employing Kerr effect.

For example, in FIG. 8, where the transparent substrate 30 is glass, the first transparent dielectric film 31 is ALN, the rare earth transition metal alloy film 32 is GdTbFe, the second transparent dielectric film 33 is ALN and the metal reflective film is Al, the Kerr rotation angle appears to be increased to 1.6°. On the other hand, the element which only employs Kerr effect has the Kerr rotation angle of about 0.3 to 0.4.

This construction, however, has the following defects.

(1) The memory element has a higher extinction ratio and is expensive, such as a Glan-Thompson prism should be employed as an analyzer.

(2) The element of the optical assembly increase in number, thereby increasing cost and increasing size.

SUMMARY OF THE PRESENT INVENTION

The present invention provides a magneto-optical memory element with the multi-layer construction which approximately has a maximum value in the ellipticity of reflected light against incident light by the aid of a circular dichroism effect of a magneto material and the interference effect of light. The memory element can simplify the optical system of the magneto-optical recording and reading apparatus. The present invention is in a magneto-optical memory element having a multi-layer construction comprising in the order from a side first receiving light from a laser: a first transparent dielectric film, a rare earth metal-transition metal alloy film, a second transparent dielectric film and a reflective film. The improvement is that the circular dichroism effect of a magnetic material is used for reading information, and the rare earth transition metal alloy film has a refractive index represented by $n \pm \Delta n$ wherein $n=3.2-3.55i$ and $\Delta n=0.05-0.03i$ and has a film thickness of 18 to 46 nm. The second transparent dielectric film has a reflective index of $2.0 \pm 0.2$ and a film thickness of 80 to 108 nm.

BRIEF EXPLANATION OF THE DRAWINGS

Further scope of applicability of the present invention will become apparent from the detailed description given below.

However, it should be understood that the detailed description and specific examples, while indicating preferred embodiments of the invention, are given by way of illustration only, since various changes and modifications within the spirit and scope of the invention will become apparent to those skill in the art from this detailed description wherein.

PREFERRED EMBODIMENT OF THE INVENTION

The present invention is illustrated with reference to the drawings.

Figure 1:
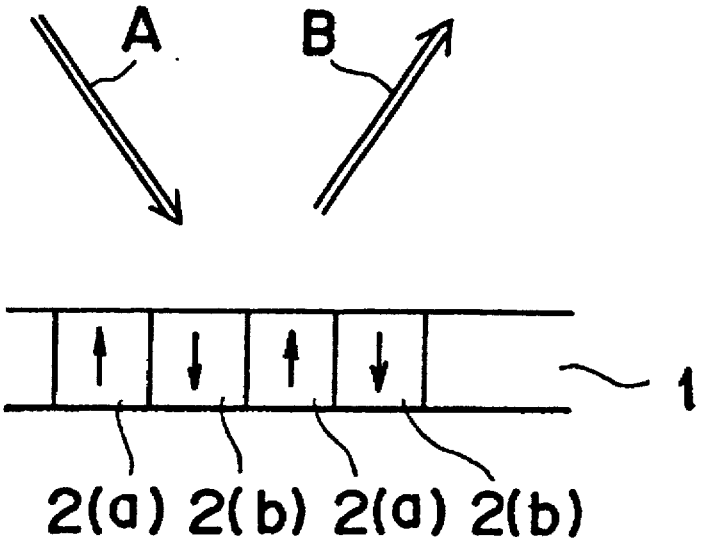
FIG. 1 is a drawing explaining circular dichroism effect.

The memory element of the present invention employs circular dichroism effect of a magnetic material, i.e., a property that the reflectance of the magnetic material to circularly polarized light is different by the direction of magnetization of the magnetic material. Circular dichroism effect will be explained initially. FIG. 1 is a drawing which explains circular dichroism effect. In FIG. 1, 1 shows a magnetic film and the arrows of 2(a) and 2(b) indicate the direction of magnetization. The light A is incident light, such as a light from a laser, etc. and B is light reflected from the film 1. Circular dichroism effect of the magnetic material is a phenomena in which the reflective index to circularly polarized light is varied according to polarized direction and corresponds to the direction of magnetization. In FIG. 1, if the amplitude reflective index to right circularly polarized light at the portion of up directional magnetization as shown by 2(a) if $r^+$ and the amplitude reflective index to left circularly polarized light is $r^-$, assuming that incident light is right circularly polarized light, the amplitude reflective index at 2(a) is $r^+$ and at 2(b) is $r^-$.

The difference of the reflective index $r^+$ and $r^-$, produces the difference in the intensity of light B which is reflected from the magnetic film 1 and provides the informations corresponding to the direction of magnetization. The degree of modulation (m) of the reflective signal is represented $$m = \frac{|r^+|^2 - |r^-|^2}{|r^+|^2 + |r^-|^2}$$

Apparently, the larger the difference in the amplitude reflective index, the better the signal quality. In view of the ellipticity (e) of reflected light which is defined as $$e = \frac{|r^+| - |r^-|}{|r^+| + |r^-|}$$

the larger the ellipticity of reflected light, the better the quality of the readout signal.

In the present invention, a multi-layer construction of the magneto-optical memory element is employed to enhance the ellipticity.

Figure 2:
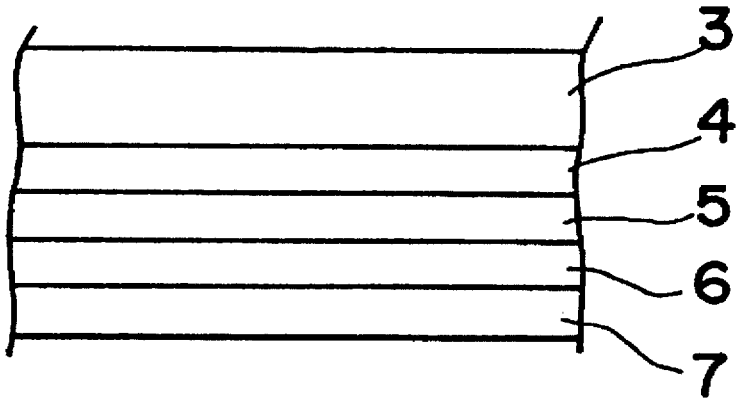
FIG. 2 shows a longitudinal section of the magneto-optical memory element of the present invention.

FIG. 2 shows a longitudinal section of the magneto-optical memory element of the present invention. In FIG. 2, 3 shows a transparent substrate of glass, polycarbonate, acryl resin, epoxy resin and the like 4 shows a first transparent dielectric film 5 shows a rare earth metal-transition metal alloy film 6 shows a second transparent dielectric film, and 7 shows a reflective film. In this construction, the ellipticity can increase by changing thickness of each layer, as mentioned in the background of the present invention.

Figure 3:
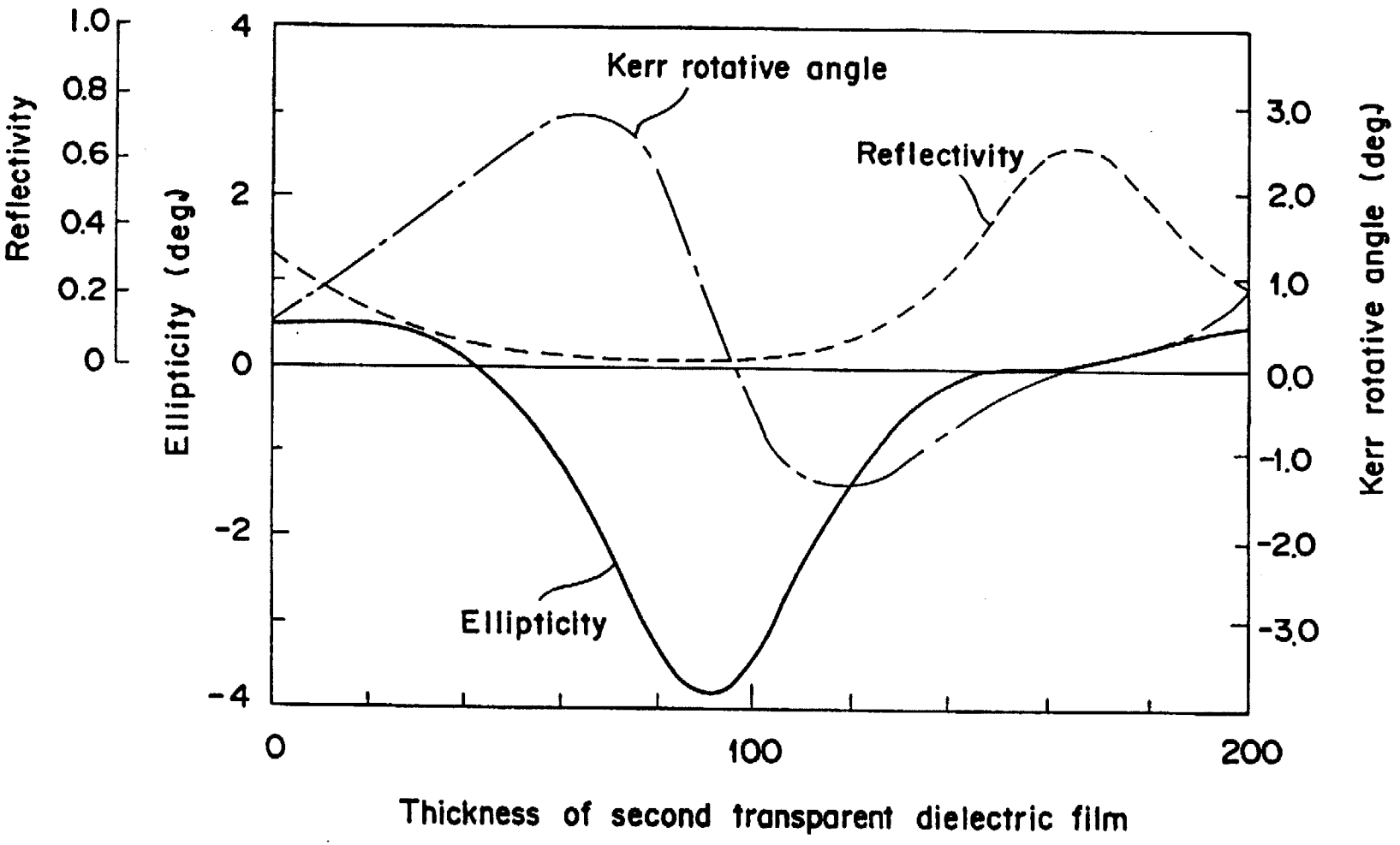
FIG. 3 shows the change of ellipticity, Kerr rotation angle and reflectivity.

FIG. 3 shows the change of ellipticity, Kerr rotation angle and reflectivity index, when the transparent substrate 3 is glass, the first transparent dielectric film 4 is an ALN film of 80 nm thickness, the rare earth transition metal alloy film 5 is a GdTbFe film of 20 nm thickness, the metal reflective film 7 is an Al film of 50 nm thickness and the second dielectric film 6 of AlN is changed from 0 to 200 nm in thickness. The change is obtained from calculation. It is apparent from FIG. 3 that the ellipticity approaches a maximum value of about 4 when the thickness of the second transparent dielectric film 6 is approximately 90 nm. If the film 6 is not present, the ellipticity is about 0.14.

The degree of modulation of the magneto-optical memory element with the above mentioned construction is measured and the result is explained below.

Figure 4:
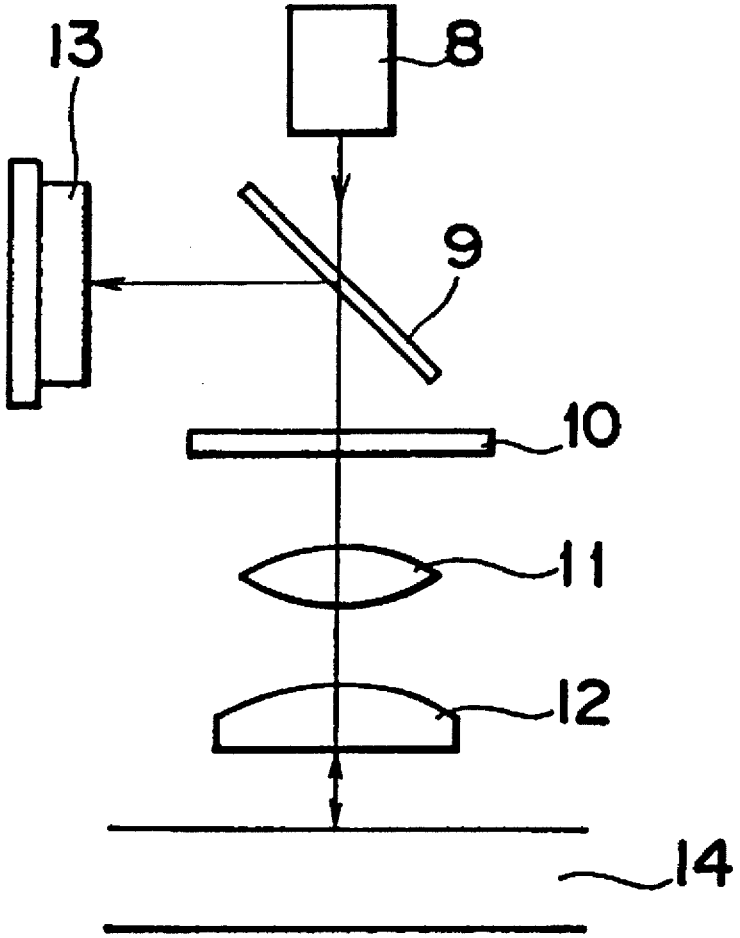
FIG. 4 schematically shows an optical reading apparatus used in the measurement of the degree of modulation of the magneto-optical memory element of the present invention.

FIG. 4 schematically shows an optical reading apparatus used in the measurement. In FIG. 4, 8 shows a semiconductor laser, 9 is a half mirror, 10 is a ¼ wavelength plate which changes linear polarized light emitted from the semiconductor laser to circularly polarized light, 12 is an objective lens and 13 is a detector of light density. This apparatus is the same as an apparatus already used for compact disks. An element indicated by 14 is a magneto-optical memory element which contains information and which has the thickness and construction as mentioned above.

The degree of modulation of the readout signal from this apparatus is about 0.08 which is nearly equal to the degree of modulation of 0.07 for conventionally available apparatus.

As mentioned above, the magneto-optical memory element of the present invention does not employ an analyzer and generates readout signal having good quality for an optical system of a compact disk.

Figure 5:
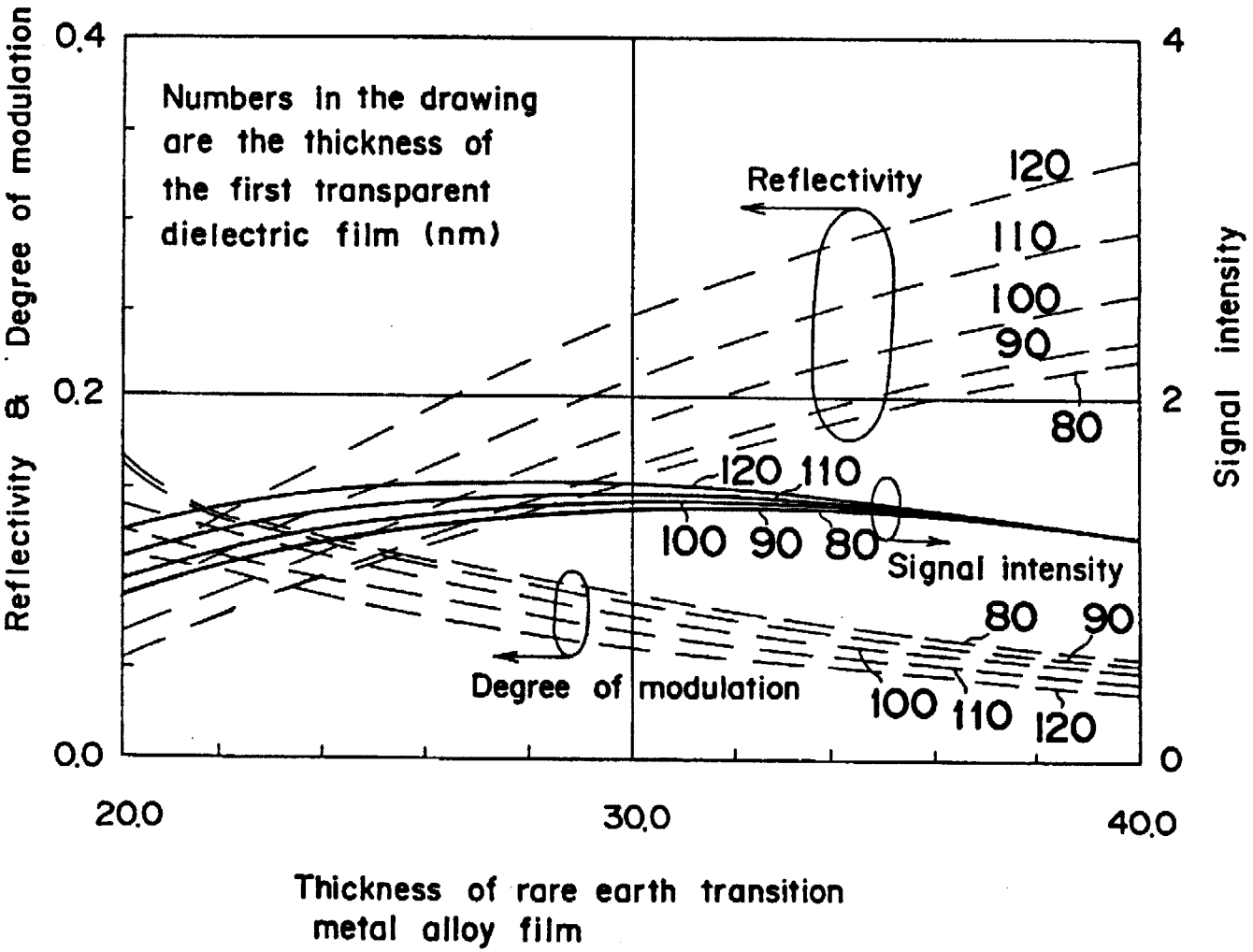
FIG. 5 shows the change of reflectivity, signal intensity and degree of modulation.

The change of degree of modulation, reflectivity and signal intensity is calculated by varying the refractive index and thickness of each layer. FIG. 5 is one example of this measurement, which shows the change of reflectivity, signal intensity and degree of modulation when the thickness of the rare earth transition metal alloy film 5 of GdTbFe is changed from 20 to 40 nm and the thickness of the first transparent dielectric film 4 is ALN is changed from 80 to 120 nm. In this case, the second transparent dielectric film 6 of ALN has a thickness of 120 nm and the metal reflective film 7 of Al is 50 nm.

As is apparent from FIG. 5, the signal intensity has a peak at 30 nm thickness. The reflectivity decreases as the thickness of GdTbFe film decreases, the degree of modulation decreases as the thickness of GdTbFe film increases.

In the practice of the present invention, the reflectivity has a minimum value in view of servo characteristics in the optical system and the degree of modulation also has a minimum value in view of signal quality. Accordingly, suitable thickness of each layer and reflectivity are found by calculation such that the reflectivity is more than 0.05 and the degree of modulation is more than 0.05. In this calculation, the refractive index of the transparent substrate is fixed at n=1.5, the optical path of the first transparent dielectric film is fixed at 160 nm and the refractive index of the metal reflective film is Al fixed at n=2−7i and 50 nm thickness. The optical path is determined from the fact that the ellipticity has a maximum value at approximately 160 nm, the metal reflective film is determined from the fact that Al has a high absolute reflectivity and the thickness of the film is selected 50 nm so that the transparent component is less than 0.02. The refractive index of the rare earth transition metal alloy film, when expressed as $n \pm \Delta n$, is fixed $n=3.2\text{-}3.55i$ and $\Delta n=0.05\text{-}0.03i$. Then, where the thickness of the alloy film is $d_1$, the refractive index of the second dielectric film is $n_2$ and the thickness thereof is $d_2$, calculation is carried to by using these 3 parameters. The conditions are listed in Table 1.

TABLE 1

| | |
|---|---|
| Transparent substrate (glass or plastics) | n = 1.5 |
| First transparent dielectric film | Optical path 160 nm |
| Rare earth-transition metal film | n = 3.2–3.55i<br>Δn = 0.05–0.03i<br>Thickness $d_2$ |
| Second transparent dielectric film | $n_2$, $d_2$ |
| Reflective film | n = 2–7i, d =50 nm |

The results of the calculation are shown in Tables 2 to 6.

TABLE 2

When $n_2$ = 1.8,
M: Degree of Modulation R: Reflectivity
S: Signal light amount

| | $d_1$ | $d_2$ | M | R | S |
|---|---|---|---|---|---|
| | 17 nm | 106 nm | 0.203 | 0.047 | 0.0095 |
| Lower limit of R | 18 | 106 | 0.178 | 0.059 | 0.0105 |
| Upper limit of M | 37 | 108 | 0.051 | 0.270 | 0.0139 |
| | 38 | 106 | 0.049 | 0.276 | 0.0135 |

TABLE 3

When $n_2$ = 1.9

| | $d_1$ | $d_2$ | M | R | S |
|---|---|---|---|---|---|
| | 19 nm | 100 nm | 0.197 | 0.049 | 0.0097 |
| Lower limit of R | 20 | 100 | 0.175 | 0.060 | 0.0105 |
| Upper limit of M | 40 | 98 | 0.050 | 0.250 | 0.0126 |
| | 41 | 96 | 0.048 | 0.255 | 0.0122 |

TABLE 4

When n = 2.0

| | $d_1$ | $d_2$ | M | R | S |
|---|---|---|---|---|---|
| | 20 nm | 92 nm | 0.219 | 0.039 | 0.0086 |
| | 21 | 94 | 0.194 | 0.049 | 0.0096 |
| Lower limit of R | 22 | 94 | 0.174 | 0.059 | 0.0103 |
| | 30 | 98 | 0.095 | 0.142 | 0.0135 |
| | 40 | 92 | 0.056 | 0.215 | 0.0121 |
| Upper limit of M | 42 | 90 | 0.051 | 0.225 | 0.0114 |
| | 43 | 88 | 0.048 | 0.228 | 0.0111 |
| | 44 | 88 | 0.046 | 0.233 | 0.0108 |
| | 45 | 86 | 0.044 | 0.236 | 0.0104 |
| | 50 | 80 | 0.035 | 0.248 | 0.0086 |

TABLE 5

When $n_2$ = 2.1

| | $d_1$ | $d_2$ | M | R | S |
|---|---|---|---|---|---|
| | 23 nm | 88 nm | 0.193 | 0.048 | 0.0093 |
| Lower limit of R | 24 | 88 | 0.174 | 0.057 | 0.0099 |
| | 43 | 84 | 0.054 | 0.196 | 0.0106 |
| Upper limit of M | 44 | 84 | 0.051 | 0.201 | 0.0103 |
| | 45 | 82 | 0.049 | 0.204 | 0.0099 |

TABLE 6

When $n_2$ = 2.2

| | $d_1$ | $d_2$ | M | R | S |
|---|---|---|---|---|---|
| | 25 m | 84 nm | 0.193 | 0.047 | 0.0090 |
| Lower limit of R | 26 | 84 | 0.175 | 0.054 | 0.0095 |
| | 44 | 80 | 0.056 | 0.172 | 0.0096 |
| | 45 | 80 | 0.053 | 0.176 | 0.0093 |
| Upper limit of M | 46 | 80 | 0.050 | 0.180 | 0.0090 |
| | 47 | 80 | 0.047 | 0.183 | 0.0087 |

Figure 6:
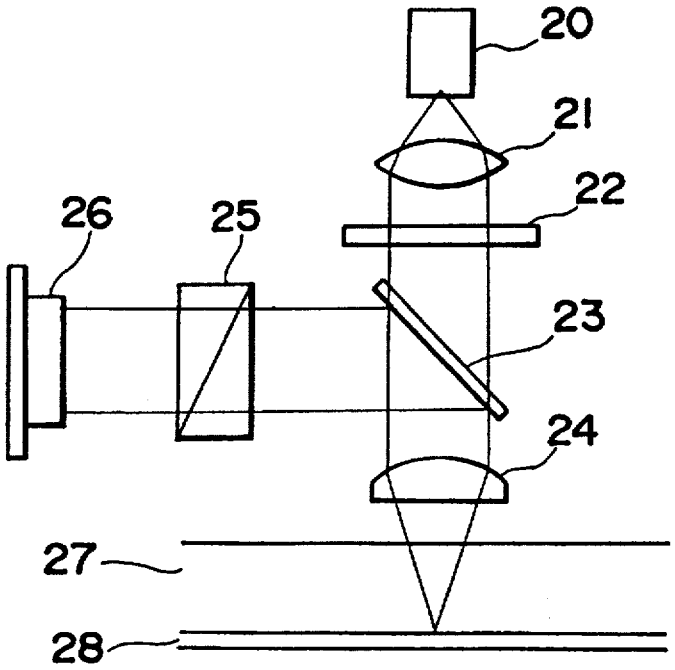
Fig. 6 Prior Art
FIG. 6 schematically shows a conventional photo-magnetic recording and reading apparatus.
Figure 7:
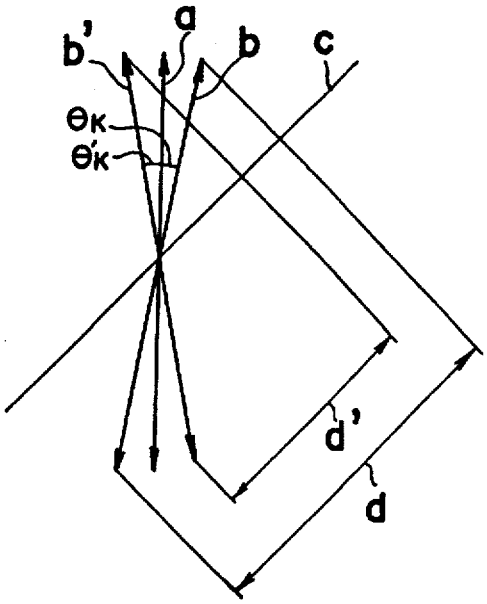
Fig. 7 Prior Art
FIG. 7 is a drawing explaining the functional principle of the apparatus of FIG. 6.
Figure 8:
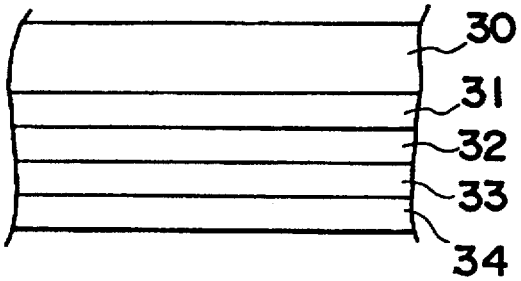
Fig. 8 Prior Art
FIG. 8 shows a partial sectional view of the magneto-optical memory element of a multi-layer construction.

As is apparent from the result of n=2.0 of FIG. 4 or FIG. 6, the reflectivity gradually increases and the degree of modulation gradually decreases, as the thickness of the rare earth transition metal alloy film increases. The thickness $d_1$ of the alloy film, therefore, is determined and then the thickness $d_2$ of the second dielectric film is also determined. If the reflectivity is more than 0.05 and the degree of modulation is more than 0.05, the thickness $d_1$ is 18 to 46 nm and the refractive index $n_2$ is 2.0±0.2 and $d_2$ 80 to 108 nm.

According to the present invention, reading of information can be done without an analyzer, thus minimizing expense and miniaturizing the apparatus. The magneto-optical element is applicable to already existing apparatus for compact disks.

What is claimed is:

1. A magneto-optical memory element having a multilayer construction and a magnetic material to produce a circular dichroism effect, comprising:

a first transparent dielectric film;

a rare earth transition metal alloy film positioned on said first transparent dielectric film;

a second transparent dielectric film positioned on said rare earth transition metal alloy film; and a reflective film positioned on said second transparent dielectric film;

said rare earth transition metal alloy film having a refractive index represented by $n \pm \Delta n$ wherein $n=3.2\text{–}3.55i$ and $\Delta n=0.05\text{–}0.03i$;

said rare earth transition metal alloy film having a film thickness of 18 to 46 nm;

said second transparent dielectric film having a refractive index of 2.0±0.2 and a film thickness of 80 to 108 nm.

*2. In a magneto-optical memory element having a multilayer construction comprising in sequence from a side on which light is incident a first transparent dielectric film, a rare earth transition metal alloy film, a second transparent dielectric film and a reflective film,*

*the improvement wherein circular dichroism effects of the rare earth metal alloy transition film are used for reading information, said rare earth transition metal alloy film has a refractive index represented by $n \pm \Delta N$ wherein $n=3.2\text{–}3.55i$ and $\Delta n=0.05\text{–}0.03i$ and a thick-*

*ness of 18 to 46 nm, and said second transparent dielectric film has a refractive index of 2.0±0.2 and a thickness of 80 to 108 nm.*

*3. A magneto-optical memory element according to claim 2, in combination with an optical system including a semiconductor laser for directing light onto said magneto-optical memory element, and a light intensity detector for receiving light emitted by said magneto-optical memory element.*

*4. A magneto-optical memory element according to claim 2, in combination with an optical system including means for directing circularly polarized light onto said element, and a light intensity detector for receiving light emitted by said magneto-optical memory element.*

*5. A magneto-optical memory element according to claim 2, in combination with an optical system including a quarter wavelength plate, a semiconductor laser for directing light through said plate onto said element, and a light intensity detector for receiving light emitted by said magneto-optical memory element.*

*6. A magneto-optical memory element according to claim 2, in combination with an optical system including a semiconductor laser for directing light onto said element, and a light intensity detector for receiving light emitted by said magneto-optical memory element, including means for transmitting said emitted light directly onto said light intensity detector.*

*7. An optical reading apparatus comprising:*

*semiconductor laser means for emitting linear polarized light;*

*means for changing the linear polarized light emitted by the laser means to circularly polarized light;*

*a magneto-optical memory element for changing the light intensity of circularly polarized light from the laser means incident thereon in accordance with information stored therein and reflecting the light so changed, said magneto-optical memory element having a multi-layer construction comprising in sequence from a side on which light is incident a transparent substrate, a first transparent dielectric film, a rare earth transition metal alloy film, a second transparent dielectric film and a reflective film, the improvement wherein said second transparent dielectric film has a film thickness of 80 to 108 nm; and*

*detector means for detecting the light intensity of the circularly polarized light reflected from the magneto-optical memory element, said reading apparatus not including a polarization analyzer for analyzing the circularly polarized light detected by said detector means.*

*8. The apparatus of claim 7 wherein said detector means detects said light intensity reflected from said magneto-optical memory element without regard to the direction of any linearly polarized light.*

*9. The apparatus of claim 7 or 8 wherein said means for changing the linear polarized light to circularly polarized light comprises a ¼ wavelength plate.*

*10. An optical reading apparatus comprising:*

*semiconductor laser means for emitting linear polarized light;*

*means for changing the linear polarized light emitted by the laser means to circularly polarized light;*

*a magneto-optical memory element for changing the light intensity of circularly polarized light from the laser means incident thereon in accordance with information stored therein and reflecting the light so changed; and*

*detector means for detecting the light intensity of the circularly polarized light reflected from the magneto-optical memory element, said reading apparatus not including a polarization analyzer for analyzing the circularly polarized light detected by said detector means.*

*11. The apparatus of claim 10 wherein said detector means detects said light intensity reflected from said magneto-optical memory element without regard to the direction of any linearly polarized light.*

*12. The apparatus of claim 10 or 11 wherein said means for changing the linear polarized light to circularly polarized light comprises a ¼ wavelength plate.*

*13. An optical reading apparatus consisting essentially of:*

*semiconductor laser means for emitting linear polarized light;*

*means for changing the linear polarized light emitted by the laser means to circularly polarized light;*

*a magneto-optical memory element for changing the light intensity of circularly polarized light from the laser means incident thereon in accordance with information stored therein and reflecting the light so changed, said magneto-optical memory element having a multi-layer construction comprising in sequence from a side on which light is incident a transparent substrate, a first transparent dielectric film, a rare earth transition metal alloy film, a second transparent dielectric film and a reflective film, the improvement wherein said second transparent dielectric film has a film thickness of 80 to 108 nm; and*

*detector means for detecting the light intensity of the circularly polarized light reflected from the magneto-optical memory element, said reading apparatus not including a polarization analyzer for analyzing the circularly polarized light detected by said detector means.*

*14. The apparatus of claim 13 wherein said detector means detects said light intensity reflected from said magneto-optical memory element without regard to the direction of any linearly polarized light.*

*15. The apparatus of claim 13 or 14 wherein said means for changing the linear polarized light to circularly polarized light comprises a ¼ wavelength plate.*

*16. An optical reading apparatus consisting essentially of:*

*semiconductor laser means for emitting linear polarized light;*

*means for changing the linear polarized light emitted by the laser means to circularly polarized light;*

*a magneto-optical memory element for changing the light intensity of circularly polarized light from the laser means incident thereon in accordance with information stored therein and reflecting the light so changed; and*

*detector means for detecting the light intensity of the circularly polarized light reflected from the magneto-optical memory element, said reading apparatus not including a polarization analyzer for analyzing the circularly polarized light detected by said detector means.*

*17. The apparatus of claim 16 wherein said detector means detects said light intensity reflected from said magneto-optical memory element without regard to the direction of any linearly polarized light.*

*18. The apparatus of claim 16 or 17 wherein said means for changing the linear polarized light to circularly polarized light comprises a ¼ wavelength plate.*

* * * * *